J. B. ROBERTSON'S
IMPROVED STUMP PULLER.

73046

PATENTED
JAN 7 1868

WITNESSES.

J. B. Robertson INVENTOR.

United States Patent Office.

JOHN B. ROBERTSON, OF NEW ORLEANS, LOUISIANA.

Letters Patent No. 73,046, dated January 7, 1868.

IMPROVEMENT IN STUMP-EXTRACTORS.

The Schedule referred to in these Letters Patent and making part of the same.

TO ALL WHOM IT MAY CONCERN:

Be it known that I, JOHN B. ROBERTSON, of the city of New Orleans, parish of Orleans, and State of Louisiana, have invented a certain new and useful Improvement in Machines for Pulling up Stumps and Roots of Trees; and I do hereby declare the following to be a clear, full, and exact description of the same, reference being had to the annexed drawings, making a part of this specification, in which—

My invention consists of a novel combination of well-known mechanical contrivances, so arranged that by the conjoint operation of the same the largest and strongest-rooted stumps may be easily and quickly drawn out of the ground and transported to whatsoever point it may be desired to take them to get them out of the way. But my invention will be more clearly understood by reference to the drawings.

Figure 1:
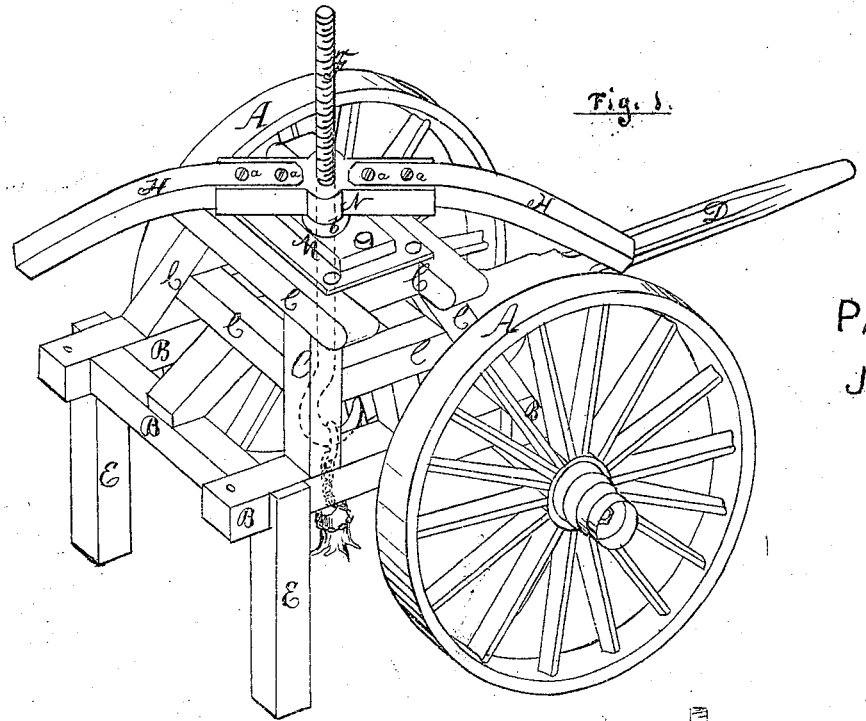
Figure 1 is a perspective view of my machine as when in use.
Figure 2:
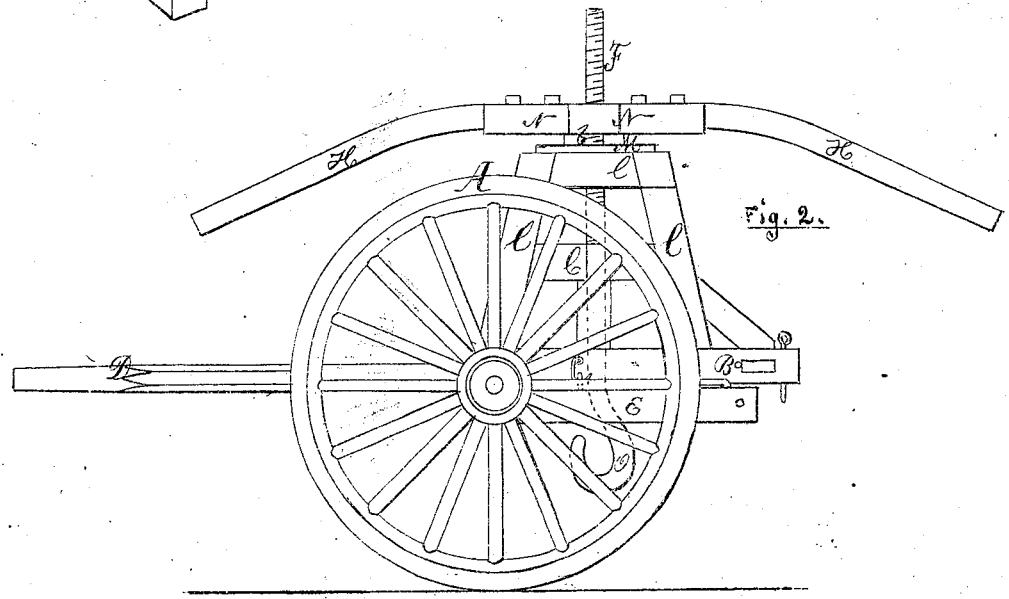
Figure 2 is a side elevation of the same as when prepared for transportation or movement from one place to another.

Upon the axle of a pair of ordinary wheels that have a very broad tire, I place a strong frame, having the form of a truncated hollow pyramid, in such a manner that it rests upon said axle only at its front side or edge, as is clearly shown at both figures upon the drawings. To the front part of the pyramidal frame is securely attached an ordinary draught-pole or tongue. The wheels are marked A, the framework B C, and the tongue D. At the rear end of the frame B C, and underneath the same, are two hinged or pivoted standards or supporting-bars, E, which, by reason of their being pivoted, may be swung up, as seen at fig. 2, so as not to interfere with the transportation or movement of the machine when not at work. When the machine is at work these standards occupy the position shown at fig. 1, and support the rear end of the frame B C. On the top of the pyramidal frame is fixed the metallic plate M, in the centre of which there is an aperture sufficiently large to allow the rod F to move up and down without positive contact with its sides. The rod F, for about two-thirds of its length from the top, is a screw, and to its lower end is attached the hook O. Upon the screw portion of the rod F is fitted the screw, collar, or nut N. The nut N is extended in two opposite directions, in such manner as to provide recesses or sockets to receive the ends of levers H, which are secured therein by screw-bolts $a$, and it rests upon a circular collar, $b$, that projects slightly above the upper surface of the plate M, and surrounds the central aperture in the same, as is clearly shown at both figures on the drawings.

The operation of the machine is as follows, to wit: A strong chain is first fastened around the stump that is to be pulled up. The machine is then placed over the stump, the standards E fixed in an upright position, and the rod F run down until it can be brought into connection with or attached to the chain around the stump by means of the hook O. The rod F may be very quickly lowered by a rapid revolution of the levers H and nut N. Fig. 1 of the drawings illustrates the condition of things at this stage of the proceeding. If the earth or ground be soft and yielding, strong pieces of plank may be put under the standards E, and also under the wheels A, to prevent the machine from sinking; but generally no such precaution need be taken. The machine having now a secure hold upon the stump, the rod F is slowly raised by a reverse movement or revolution of the levers H. The elevation of the rod F pulls up the stump, and the operation is completed. The standards E are now folded up, as shown at $F^2$, and the stump is removed from the field. The same process is pursued with reference to the next stump, and so on, *ad infinitum*.

If the power of the two men who attend the machine be insufficient to pull up a stump, and this will probably be the case when the stump is very large and strongly rooted, the animals that are used to pull the machine, be the same horses, mules, or oxen, may be attached to the levers H, by proper appliances, in a very brief space of time. The levers H may be of any length; and hence there is no stump that may not be pulled up with the aid of the animals that must necessarily be employed in the transportation of the machine from place to place.

I am well aware that stump-pulling machines are not new, and that certain parts of my improvement have been used in connection with such machines for many years; and hence I do not claim broadly a stump-pulling machine, nor any of the parts of my machine separately considered; but having fully described my invention, What I do claim, and desire to secure by Letters Patent, is—

The truncated pyramidal frame structure B C, when the same is supported at its front end by the axle of the wheels A, and at its rear end by the pivoted adjustable standards E, in combination with the rod F, screw, collar, or nut N, metallic plate M, circular collar $b$, and pivoted standards $b$, when these several parts are constructed and arranged for conjoint operation, substantially as herein described, for the purpose set forth.

JNO. B. ROBERTSON.

Witnesses:
RUFUS R. RHODES,
H. N. JENKINS.